United States Patent Office 3,489,206
Patented Jan. 13, 1970

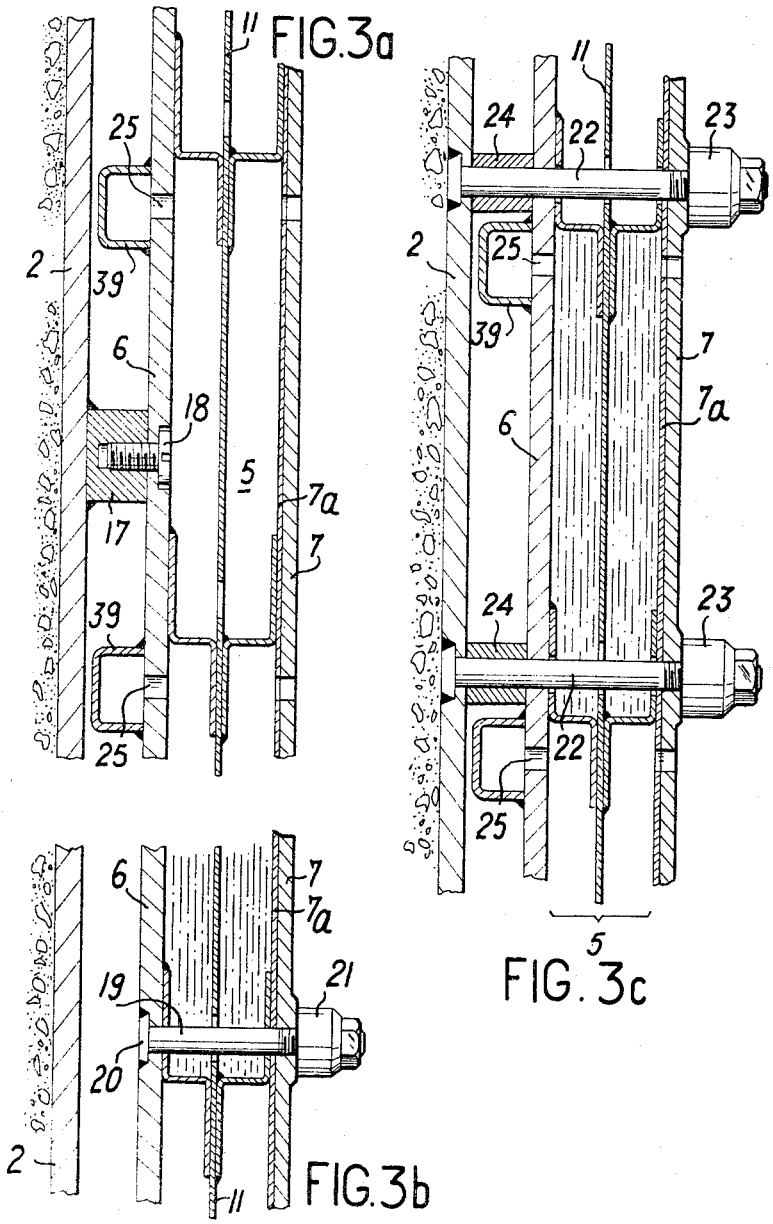

3,489,206
THERMAL SHIELD FOR HEATING ENCLOSURE
Yves Lecourt, Paris, France, assignor to Société Pour l'Industrie Atomique (Socia), Paris, France
Filed Dec. 5, 1967, Ser. No. 688,222
Claims priority, application France, Dec. 23, 1966, 88,711
Int. Cl. F24h *3/00;* F28d *15/00;* G21c *1/00*
U.S. Cl. 165—47          14 Claims

ABSTRACT OF THE DISCLOSURE

In order to protect the internal wall of a heating enclosure, a porous barrier is placed at a distance from said wall. A heat-transporting fluid is introduced through headers contained in the cooling chamber which is defined by said barrier and said internal wall. The fluid is perfused through the porous barrier and transfers to the hot enclosure the heat which is contained within said barrier. The heat which may have passed through the barrier in the direction opposite to the direction of flow of the perfused fluid is evacuated into the cooling chamber by the fluid which circulates within the headers.

---

The invention is concerned with a thermal shield comprising the complete assembly of the porous barrier which defines a cooling chamber and of the circulation system whereby the heat-transporting fluid is fed from said cooling chamber into the porous barrier in the direction of the enclosure.

In a large number of industrial applications, it proves desirable and necessary to ensure that a predetermined temperature of low value is maintained with maximum reliability on all or part of the internal surface of an enclosure in which the prevailing conditions of temperature and pressure can vary to a substantial extent.

This is the case in particular of some enclosures or furnaces for chemical reactions as well as nuclear reactors of the type comprising a prestressed concrete vessel which is designed for containment of the coolant pressure. In this specific case, the temperature which prevails throughout the concrete vessel structure must be limited to a low and uniform value, whereas the conditions of temperature and pressure which are imposed within the vessel by onload operation of the nuclear reactor are extremely severe with respect to the insulating structuers which are at present known. This result is usually obtained by means of a shield which provides insulation from the heat flux, said shield being fitted inside the pressure vessel in close contact with the leak-tight lining membrane of the reactor. In the majority of cases, said shield is composed either of metallic casing elements of small thickness which provide spaces for layers either of stagnant gas or of pumice concrete.

Up to the present time, builders of nuclear power plants have encountered serious difficulties in this field owing to the poor pressure characteristics of heat-insulating materials at present known, the substantial thicknesses which are consequently made necessary and which increase the cost of construction, or the resultant heat losses which are detrimental to economy of operation: in fact, the structures employed heretofore have suffered to a considerable extent from the convective motion and pressure variations of the heat-transporting fluid of the reactor, or coolant, in which said structures are immersed.

Generally speaking, the design requirements attached to the operation and exploitation of a nuclear reactor necessarily lead in the case of this type of thermal shield to a number of very stringent conditions which can be summarized as follows:

The heat-insulating structure or material must not introduce any impurities either in the reactor or in its associated fluid circuits;

The insulating material employed must not age to any appreciable extent under the action of nuclear radiation or within the limit of the doses established in the case of each particular reactor;

Complete reliability of operation of the thermal shield must be ensured since no servicing can be contemplated throughout the life of the reactor;

Further conditions of a mechanical order can be mentioned in connection with the virtually absolute rigidity of the prestressed concrete pressure vessels and the very wide range of possible operating conditions of a nuclear power reactor for the generation of electricity;

At the time of approach to full reactor power and heating of the coolant, the thermal shield must have a mechanical behavior which is compatible with the different relative movements of expansion resulting from heating of the material or from variations in coolant pressure; in particular, the structures and materials employed must be capable of affording resistance to sudden variations of temperature and pressure which may in some cases arise from the coolant;

In reactors of the prestressed concrete pressure vessel type, the internal surface of the vessel is usually covered with a leak-tight metallic structure or so-called lining membrane which must be maintained in a very uniform manner at the lowest possible temperature (if possible below 30° C.).

The present invention is directed to a thermal shield for a heating enclosure and especially for the prestressed concrete pressure vessel of a nuclear reactor, wherein said shield meets the practical requirements which have been set forth in the foregoing while being both simple to construct and affording perfect reliability of operation.

Said thermal shield is essentially characterized in that it comprises a cooling chamber in the vicinity of the internal wall of the enclosure, and a barrier having a porous structure with a low coefficient of permeability which is parallel to said internal wall and delimits the cooling chamber therewith, headers within said chamber for supplying a cold fluid which is perfused through the porous barrier in the direction of the enclosure, and means for ensuring a continuous supply of fluid to said headers.

In a general manner, the porous barrier of the thermal shield according to the invention is made up of a stack or stratification of layers of metallic or mineral fabric elements of variable texture having a general direction which is parallel to the plane of the barrier. Said stratification of layers of fabric elements is usually rendered compact by clamping between two metallic plates or sheets which are pierced by holes.

During operation, said plates are at different temperatures; in the remainder of this description, the plate through which fresh fluid is admitted will be designated as the "cold plate" whereas the plate which is in direct contact with the heat source will be referred to as the "hot plate."

The meshes of the fabric endow it with the necessary porosity; the permeability of the barrier is a function of the fineness of the fabric, or its texture (plain cloth, reps, etc.), of the arrangement of a set of fabric elements having different characteristics, and finally of the degree of compactness of this arrangement.

The nature of the porous barrier varies in accordance with the invention according to the chemical composition of the cool fluid which is perfused through it and also according to the chemical nature of the different fluids which are contained in the enclosure. In the case of the application of the present invention to a nuclear reactor of the prestressed concrete pressure vessel type, the cool fluid employed is in fact the reactor coolant itself (gas, water, liquid metal) which has previously been brought to the requisite conditions of temperature and pressure.

Depending on the flow mechanism of the cool perfused fluid, the porous barrier which is employed in the thermal shield can be constructed in accordance with different embodiments.

In a first embodiment, the thermal shield comprises a porous barrier through which the stream of cool fluid passes at right angles to the plane of said barrier over its entire surface.

In a second embodiment, the cool fluid flows through the porous barrier which constitutes the thermal shield along paths which are parallel to the plane of said barrier. The porous barrier is accordingly provided with a number of internal partitions in the form of baffles which are intended to cause the cool fluid to pass through the barrier along a path having the shape of either one or a number of successive hairpin bends in a direction parallel to the plane of the barrier itself. One alternative form of this last-mentioned embodiment consists in providing in the plane of each partition referred to a heat-insulating wall structure or liner which is formed of the same material as the barrier but through which the fluid does not pass. This arrangement makes it possible to reduce to a very substantial degree the quantity of thermal fluid which flows through the barrier, namely to limit the flow rate of the perfused fluid while maintaining the same thermal efficiency. In order to prevent said fluid from flowing through the insulating liner, said liner is confined between two casing elements formed of thin metallic sheeting in which provision is made for a plurality of eyelets for lining the vents which provide passageways from one compartment of the baffle to the other.

However, the nature of the porous barrier is the same in all embodiments and only its hydrodynamic characteristics are different.

The fabric elements which are employed in the structural make-up of the barrier have, for example, the texture of plain cloth which can readily be adapted to the object contemplated by forming alternate layers of different degrees of fineness since, in this manner, the undulations of the threads of two consecutive layers interpenetrate in a satisfactory manner. However, any other fabric texture would also be suited to the purpose such as, in particular, reps, which should make it possible to obtain greater degrees of fineness than plain cloth.

In the case of the application of the thermal shield according to the invention to nuclear reactors which are cooled by heavy water or light water or reactors of the liquid metal cooled type, the fabric elements are preferably made of stainless steel. However, other metals such as heat-resistant metals (tungsten, tantalum, molybdenum, etc.) can be employed although their cost price is very substantially higher. In the case of gas-cooled nuclear reactors, the fabrics can be of mineral composition such as, for example, glass, silica, asbestos and so forth; in this particular case, it can also be judicious to employ composite structures consisting of alternate layers of metallic and mineral cloths. One of the essential technological advantages of the woven materials employed in the fabrication of porous barriers for thermal shields in accordance with the invention lies in the fact that they are better suited to the thermal variations imposed by the operation of nuclear reactors without thereby subjecting the support structures to excessive reactions. This advantage provides a satisfactory solution to the problem of heat expansion which is usually encountered in conventional rigid structures. This property arises from the fact that the constituent threads of the fabric elements are undulated, thereby enabling them to become deformed at right angles to the plane of the cloth, with the result that the surface area and flatness of this latter remain constant at the time of any variation of temperature.

A further advantage of the porous barrier for a thermal shield in accordance with the invention lies in the fact that a woven fabric has a non-fragile and flexible structure while at the same time being cohesive. As a result of this property, the danger of emission of dust particles or fibers or, more generally, of substances which are undesirable from a nuclear point of view, can be considered as non-existent.

From a thermal standpoint, the woven materials which are assembled in strata and are compacted afford very low natural thermal conductivity, which is an essential property for limiting the quantities of heat which pass through the barrier. This low natural conductivity is due to the point contacts between the fabric elements of contiguous layers and to the high heat-resistance of these contacts.

In the shields according to the first embodiment of the invention, the cool fluid which is perfused through the porous barrier is supplied through a distribution chamber constituted by the cooling chamber which is located between the wall of the enclosure which it is desired to protect thermally and the barrier. In the particular case of a nuclear reactor of the prestressed concrete pressure vessel type, said cooling and distribution chamber is defined by the high pressure-drop barrier and the lining membrane or an auxiliary plate which is applied against said membrane. The chamber contains a bank of distribution tubes or inlet headers pierced by wide and uniformly spaced openings which have a double function, namely that of supplying fresh fluid and removing heat which has passed through the barrier. The effect of said openings is such that the tube bank ensures the distribution of the flow of cool fluid which is perfused into the porous barrier and which is uniformly distributed over the entire surface of said porous barrier.

In the shields in accordance with the second embodiment, the tube bank contained in the cooling chamber can either be adapted to supply a distribution chamber in the same manner as in the previous example or to supply the baffles directly; in the latter case, the inlet headers are advantageously secured to the cold plate itself of the porous barrier.

The fluid flow rate which is in fact established within the inlet headers is substantially higher than the perfused flow; the function of the non-perfused flow is to remove the quantity of heat which has passed through the porous barrier.

At the time of utilization of the thermal shield, a mass of cool fluid under pressure which is derived from the inlet header tubes of the cooling chamber is fed through a porous barrier having a low coefficient of permeability, the function of which is to ensure the uniform and stable distribution of this flow over the entire surface to be protected. Thus, in accordance with the invention, the outer wall of the enclosure is brought at all points to the temperature of the cool fluid at the time of its admission into the thermal shield.

The cool fluid which has been perfused into the porous barrier can be recovered or not at the outlet of this latter. When the invention applies to a nuclear reactor, the identical nature of the cooling fluid which is perfused into the shield and of the heat-transporting fluid or coolant of the reactor permits of pressure equalization of these two fluids by opening a permanent connection between the two separate systems.

The foregoing represents a further appreciable advantage of the present invention, as will be apparent from the examples which will be described hereinafter.

Referring now to the diagrammatic FIGURES 1 to 5 of the accompanying drawings, there will be described below a number of examples of construction of the thermal shield for a heating enclosure as contemplated by the invention. The practical arrangements which will be described in connection with these examples must be considered as forming part of the invention, it being understood that all similar arrangements could also be adopted without thereby departing from its scope.

Corresponding elements in the different figures are designated by identical reference numerals.

FIGS. 3a, 3b and 3c illustrate different modes of attachment employed for the thermal shield as well as the means employed for clamping the porous barrier proper;

Figure 4:
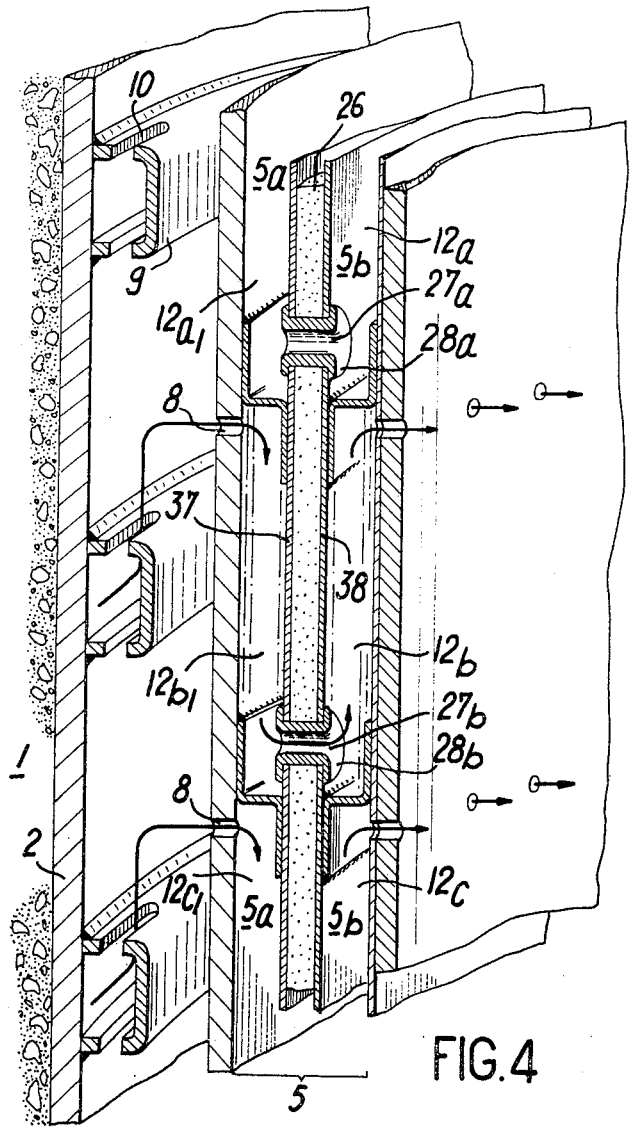
FIG. 4 illustrates an alternative embodiment of the thermal shield in which the porous barrier is provided in its central plane with an insulating wall structure or liner through which the fluid does not flow.

For the sake of clarity of certain details, the porous barrier is not shown in its entirety in FIGS. 2 to 4.

The descriptions which now follow are given in connection with the case of application of the thermal shield in accordance with the invention to a nuclear reactor of the prestressed concrete pressure vessel type; it will be clearly understood that these different examples of application must not be considered as having any limitative character and that the invention applies on the contrary to all types of heating enclosures such as, for example, enclosures employed in the chemical industry for carrying out exothermic reactions or reactions which are intended to take place at high temperature.

Figure 1:
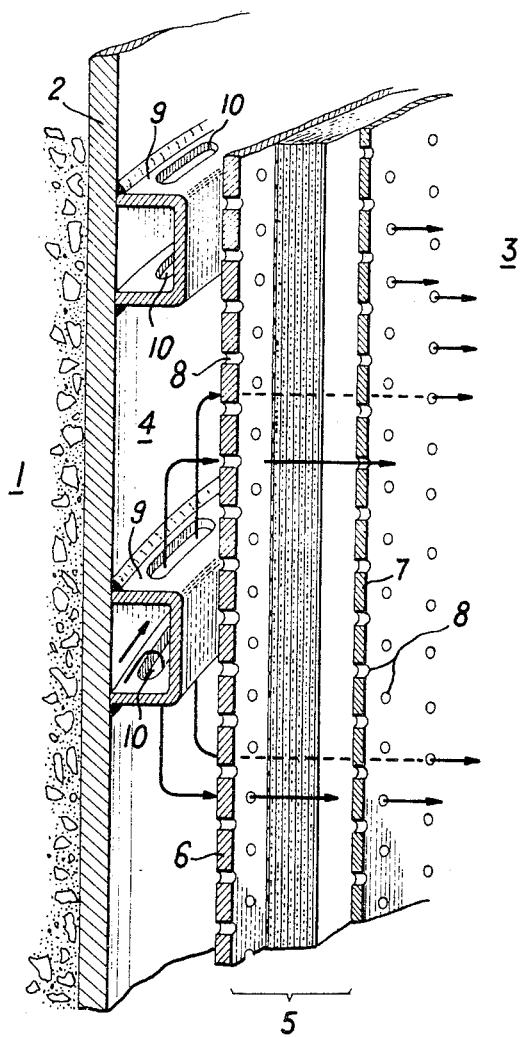
FIG. 1 is an exploded sectional view of a first embodiment of the thermal shield in accordance with the invention.

FIG. 1 shows in cross-section the concrete casing 1 or shell of a nuclear reactor of the prestressed concrete pressure vessel type. There is applied against said shell in known manner a lining membrane 2 which provides a reliable means for preventing any leakage of radioactive products towards the exterior. The interior of the reactor is in contact with the heat-transporting fluid which, in different designs, can either be a gas, a mineral liquid, an organic liquid, or a liquid metal, and is designated in the figure by the reference numeral 3.

In accordance with the invention, the thermal shield which extends between the lining membrane 2 and the internal volume 3 of the reactor essentially comprises two sections, namely a cooling chamber 4 and a porous barrier 5 proper which is clamped between two plates 6 (or cold plate) and 7 (or hot plate) which are of substantial thickness (from 5 to 10 millimeters) and pierced by a number of drilled holes such as the hole 8. The means for clamping the porous barrier between these plates 6 and 7 as well as the means for securing the thermal shield as a whole to the lining membrane 2 of the reactor will be described in greater detail hereinafter in reference to FIGS. 3a, 3b and 3c.

The cooling chamber 4 contains a predetermined number of inlet headers 9 for the admission of cool fluid. In the embodiment of FIG. 1, said inlet headers are welded directly to the lining membrane 2 of the reactor vessel but this form of construction is obviously not limitative. The inlet headers 9 are provided with wide apertures 10 which are judiciously distributed over the header surfaces. Said apertures 10 open into the chamber 4 which thus serves to distribute fresh fluid over the entire surface of the outer plate 6, that is to say direct the fluid through the holes 8 and the porous barrier 5 itself.

Said porous barrier is made up of a stratification of textile layers which may be formed of either metallic or mineral cloth and are of variable texture but located in a direction which is parallel to its plane. The thickness of the barrier can be of the order of a few millimeters to several centimeters, depending on the quantity of heat which can acceptably be lost and which passes through the barrier.

When the perfused fluid flows at right angles to the plane of the barrier, which is the case in this first embodiment, the greater part of the pressure drop is obtained by an alternate arrangement of close-weave fabric elements and elements of more open weave in such a manner that the porosities created by the meshes constitute flow paths which have the greatest possible number of contractions and expansions per unit length. A plurality of layers of fabric elements of exceptionally close weave can be disposed at uniform intervals within the thickness of the assembly in order to reduce the permeability of the barrier.

The porous barrier can be designed in the form of a juxtaposed assembly of prefabricated panels or even as a continuous covering over the entire surface to be protected; the properties of thermal adaptation of the textile materials in accordance with the invention in fact permit this mode of utilization. On the other hand, the plate 7 which serves to support the porous barrier is divided or segmented by reason of its rigidity in order to permit of its free expansion.

However, a certain amount of heat pass through the barrier, is transported towards the header tubes 9 through the intermediary of convective circulation loops of the thermo-siphon type which form within the cooling and distribution chamber 4 and is removed by the fluid which remains within the headers 9; the flow rate of the fluid which remains within these headers is higher than that of the fluid which is perfused through the barrier 5.

By way of non-limitative example, there can be given the following values of different characteristics of a thermal shield as applied to a nuclear reactor of the graphite-moderated gas-cooled type comprising a pressure vessel of prestressed concrete. The interior of the reactor is at 250° C. and the heat-transporting carbon dioxide gas is at a pressure of 40 bars; the porous barrier of asbestos produces a pressure drop of 0.2 bar. The thickness of the barrier is 6 millimeters and the specific thermal flux which passes through this latter is of the order of 1300 watts/m.$^2$. The cool perfused carbon dioxide gas which flows from the headers 9 is at 30° C. and its rate of flow per m.$^2$ of barrier attains $7.5 \times 10^{-3}$ kgs./sec.

Figure 2A:
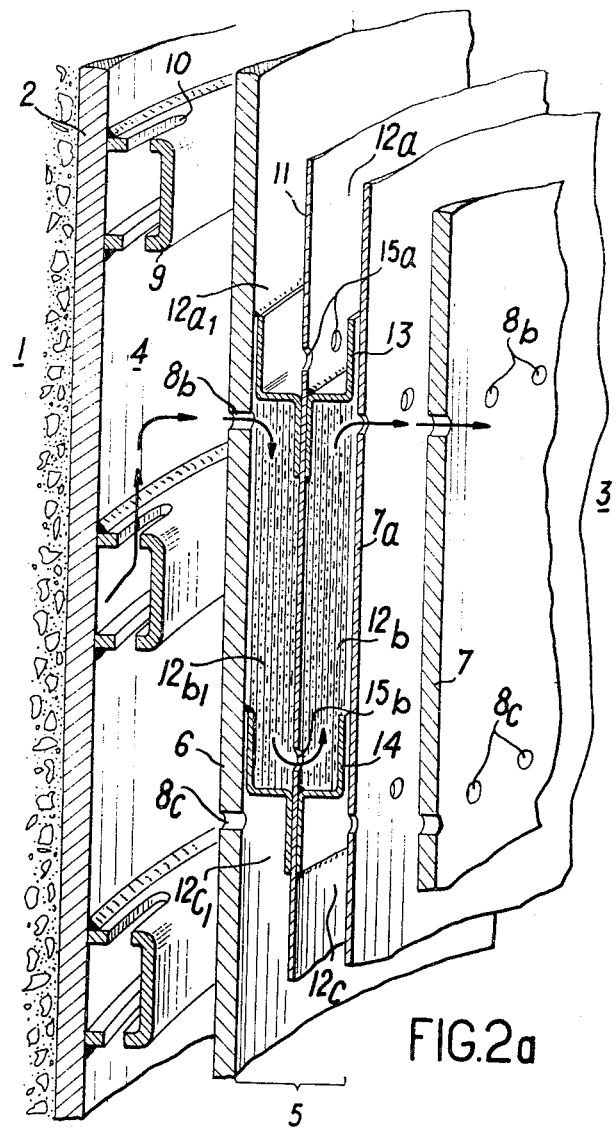
FIG. 2a is an exploded sectional view of a second embodiment of a thermal shield comprising two hairpin passageways.

FIG. 2a relates to a second embodiment of the thermal shield in accordance with the invention. The main elements of FIG. 1 are again shown in this figure and only the constructional arrangement of the porous barrier 5 is substantially different. In fact, the barrier is divided into two sections by a thin central plate 11 which is parallel to the plates 6 and 7 and comprises a number of compartments such as those designated by the references 12a, 12b and 12c and 12$a_1$, 12$b_1$ and 12$c_1$ which are delimited by thin Z-shaped plates such as 13 and 14, said plates being secured both to the plate 11 and to the plates 6 and 7. The thin intermediate plate 11 is pierced by a series of aligned holes 15a and 15b which are located at the lower end of each compartment 12a, 12b, 12c and 12$a_1$, 12$b_1$ and 12$c_1$. The plates 6 and 7 are in turn pierced by a number of series of aligned holes such as 8b and 8c each corresponding respectively to the upper portion of a compartment 12b, 12$b_1$ or 12c, 12$c_1$. Since the hot plate 7 is of substantial thickness, it is necessary to divide it; under these conditions, a second subjacent plate 7a of small thickness which is placed in overlapping relation and provided with drilled holes corresponding to those of the plate 7 is mounted in order to restore the continuity of the barrier 5 between said plate 7 and the compartments 12a, 12b and so forth.

There is shown in FIG. 2a a baffle with two passageways. In practice, a baffle comprising four passageways appears to achieve the maximum which is compatible with difficulties of construction. The walls of the baffle and the associated Z-section members which delimit each passageway are formed of sheets of stainless steel of small thickness which can attain a few tenths of a millimeter. Leak-tightness between the passageways is suitably ensured by means of wide overlapping of the sheets and sectional members which constitute the walls and baffles. In the case in which leak-tightness in the vicinity of two compartments is considered to be unsatisfactory, the elements can naturally be welded together in order to ensure that any abnormal leakage of fluid is completely prevented.

Figure 2B:
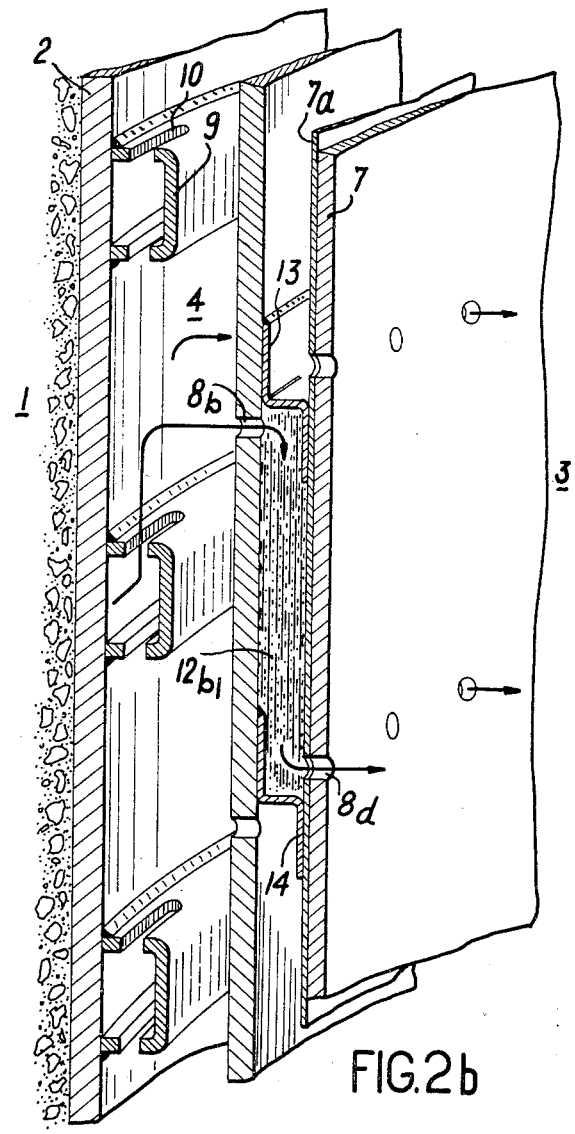
FIG. 2b is an exploded sectional view of an alternative embodiment of the thermal shield of FIG. 2a which comprises only a single passageway.

FIG. 2b illustrates an alternative form of construction in which the fluid flows into the barrier along a single path; the thin Z-section members 13, 14 are in this case secured between the plates 6 and 7 and this latter as well as the plate 7a is pierced by holes 8d in lines corresponding to the lower portion of each compartment. The cool fluid is perfused downwards between the holes 8b and 8d of each compartment in the same manner as in the compartment 12$b_1$ of FIG. 2a.

In the same manner as in the embodiment of FIG. 1, it is possible in this example to design a porous barrier as a continuous lining or covering of the surface to be protected or to adopt a technique which consists in covering the lining membrane 2 of the reactor with separate prefabricated panels. In this case as in the previous embodiment, the plate 7 is divided or segmented by reason of its rigidity.

Finally, FIG. 4 shows an alternative form of construction of the double-passageway baffle of FIG. 2a in which the porous barrier 5 is separated into passageways 5a and 5b by a heat-insulating wall structure or liner 26 formed of the same material as the porous barrier, namely a stratification of fabric elements delimited by two jackets 37 and 38 formed of thin plates, the two passageways being divided into compartments 12a, 12b by means of sectional members 13, 14. That portion of the insulating liner 26 which is located within each compartment 12a, 12b is provided at the bottom portion thereof with openings 27a, 27b for the passage of cool fluid, said openings being lined with protective eyelets 28a, 28b which are intended to prevent the admission of fluid into the insulating liner. It is readily apparent that the structure which is shown in this figure is give solely by way of example and that the barrier 5 could be provided with a series of passageways such as those designated by the references 5a and 5b which are greater in number than two, each passageway being separated from the adjacent passageway either by an insulating liner of type 26 or by a thin plate of type 11 (as shown in FIG. 2a).

The porous material of the barrier is formed in the same manner as in the case of FIG. 1. However, when the perfused fluid flows in a general direction parallel to the layers of fabric elements, which is the case with the second embodiment, the greatest pressure drop is obtained in the case of a structure which is similar to the preceding but which is endowed in principle with greater compactness. This compactness can be obtained and adjusted to the desired value by clamping the porous layer between the two high-strength structures 6 and 7 of the shield.

In these baffle-type shields, the removal of the thermal flux is carried out in the same manner as in the direct-passage shields.

The baffle type of construction produces a pressure drop between the two faces of the barrier which can be substantially greater than that of a direct-passage barrier according to the first embodiment which has the same thickness of porous material. This baffle construction therefore makes it possible in principle to work with lower flow rates of perfused fluid while retaining the same operational reliability. In addition, the baffle system results in a better utilization of the cool perfused fluid from the thermal point of view, that is to say in lower heat losses for the same quantity of materials employed. On the other hand, the complexity of the structure is evidently greater.

In FIGS. 3a and 3c, which both relate to alternative forms of construction of the thermal barrier with passageways of the baffle type, the ducts 39 for the supply of cool fluid are welded directly to the cold plate 6 of the porous barrier shield. In this case, said plate 6 is provided with a series of holes 25 which open into the interior of the supply ducts 39, so that the cool fluid can thus be fed directly into the compact structure of the porous barrier 5.

Said plate 6 of substantial thickness which constitutes one of the parts of the porous barrier support structure permits heat transfer processes of two types: it plays the part of a heat drain so that a part of the heat which is collected by conduction is thus directed towards the inlet header tubes whilst the remainder of the heat is evacuated towards the same headers by convection within the chamber 4 which is limited by the lining membrane 2 and the porous barrier 5.

In this case, the chamber 4 contains a cooling fluid such as, for example, a stagnant fluid of the same kind as the fluid which flows through the headers and which, in the case of a nuclear reactor, is the reactor coolant. Said fluid transfers to the headers by natural convection the heat which has passed through the porous barrier and facilitates the removal of this heat by the fluid which circulates within said headers.

FIGS. 3a, 3b and 3c also show details of the system of attachment employed for the thermal shield in accordance with the invention. FIG. 3a serves to show the manner in which, in one of these modes of construction, a porous barrier 5 can be secured to the lining membrane 2 of the reactor. To this end, a lug 17 which is welded to the lining membrane 2 is provided with an internally-threaded bore for accommodating a screw 18 which is applied against the cold plate 6.

In the case of FIG. 3b, the method adopted for clamping the porous barrier 5 between the plates 6 and 7 which are provided for this purpose as seen to consist in the use of a stud 19 which is welded within the plate 6 at one end and threaded at the other end so as to cooperate with a nut 21 which is applied against the plate 7.

In FIG. 3c, another variant is shown in which the two functions mentioned above are carried out at the same time by means of studs 22 which are threaded at one end, are passed through the thermal shield from one side to the other, and applied against the plate 2 and against the plate 7 by means of nuts 23. Spacer members 24 which are located between the lining membrane 2 and the plate 6 ensure the correct transmission of mechanical stresses along the stud 22.

Figure 5:
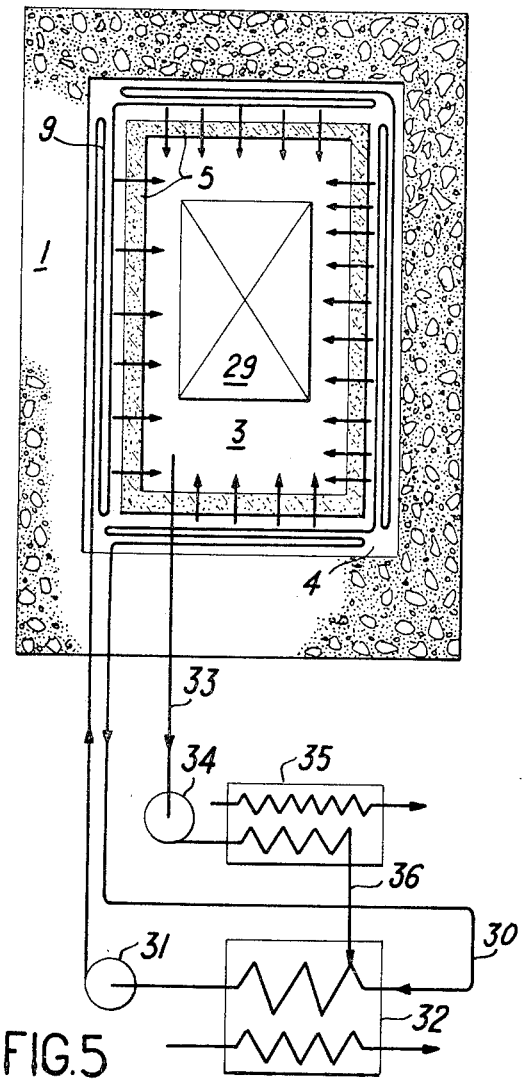
FIG. 5 is a general arrangement diagram showing the circulation of the fluid which is perfused through the thermal barrier in the case of application of this latter to a nuclear reactor of the prestressed concrete pressure vessel type.

The manner in which the thermal shield in accordance with the invention is supplied with cool fluid can be understood from FIG. 5. In this figure, the nuclear reactor is shown diagrammatically with its concrete casing 1 and its internal space 3 containing the reactor core 29. There is mounted in parallel relation with the casing 1 the porous barrier 5 which is supplied with cool fluid via the headers 9 which are fixed inside the chamber 4, said headers being connected in series to a main circulation system 30 in which the fluid is circulated by a pump 31. The fluid of the system 30 which has collected heat from the chamber 4 is cooled by means of a heat exchanger 32 prior to being returned into said chamber. The fluid which has been perfused through the porous barrier 5 and the flow rate of which is appreciably lower is recovered by way of a pipe 33, aspirated by a pump 34, cooled in an auxiliary heat exchanger 35 and re-injected at 36 into the circulation system 30 upstream of the main heat exchanger 32.

The operation of the thermal shield in accordance with the invention is therefore as follows: a part of the cool fluid which is supplied through the headers 9 is perfused through the porous barrier 5 via the different holes such as 8 or 25 which are formed through the cold plate 6 of the barrier. The liquid heats progressively as it progresses through the barrier and then passes out of this latter at an intermediate temperature between its admission temperature and the temperature of the nuclear reactor coolant in the vicinity of the thermal shield. Within the shield itself, the heat passes back along the fluid stream in the opposite direction by conduction within this latter and within the structures of the barrier. The heat reaches the cooling chamber 4, from which it is transferred to the headers 9 and collected by the fluid which is circulated within these latter.

The quantity of heat which is absorbed by the thermal shield is dependent on the thermal gradient on the admission side of the barrier and this gradient in turn results from the flow rate of cool fluid, from the heat capacity of said fluid, and from the insulating properties of the constituent materials of the porous barrier 5. It is worthy of note that this quantity of heat which is collected within the header tubes for the supply of cool fluid decreases with the rate of flow of perfused fluid. The quantity of heat transported by conduction up to a predetermined point within the thickness of the barrier is not wholly re-transmitted towards the colder adjacent points as is the case in pure conduction once normal operating conditions are established but is partly absorbed by the fluid which circulates in the opposite direction. In both cases, the quantity of heat which it is necessary to exchange with the exterior of the thermal shield system and of the reactor is equal to the sum of the quantity of heat which is drained by the tubes 9 and of the sensible heat of the perfused flow which corresponds to the difference in temperature between the admission of cool fluid and the reactor coolant.

What we claim is:

1. A thermal shield for a heating enclosure, which comprises a cooling chamber in the immediate vicinity of the internal wall of the enclosure, a barrier having a porous structure with a low coefficient of permeability which is parallel to said internal wall and defines the cooling chamber therewith, headers within said chamber for supplying a cold fluid which is perfused through the porous barrier in the direction of the enclosure, uniformly spaced openings within the cooling chamber headers dividing the fluid into two parts, a first part being perfused into the porous barrier in the direction of the enclosure and a second part being circulated within the headers and collects the heat which has passed through said barrier in the direction of the wall to be protected, means for cooling the fluid and means for circulating the path of the fluid through said cooling means to the headers.

2. A thermal shield in accordance with claim 1 the cooling chamber being filled with a heat-removing fluid.

3. A thermal shield in accordance with claim 1, the porous barrier being a stratification of parallel layers of fabric of mineral composition.

4. A thermal shield in accordance with claim 1, the porous barrier being a stratification of parallel layers of fabric of metallic composition.

5. A thermal shield in accordance with claim 1, the porous barrier being a stratification of parallel layers of fabric of composite metallic and mineral structure.

6. A thermal shield in accordance with claim 3, the fabrics employed for the porous barrier being variable in texture and in fixation from one stratum to the other, the arrangement of the different fabric elements being determined as a function of the hydrodynamic properties desired.

7. A thermal shield in accordance with claim 1, the porous barrier being clamped between two plates pierced by holes for the circulation of cool perfused fluid at right angles to said barrier and for uniform distribution of the perfused flow over the entire surface of the barrier.

8. A thermal shield in accordance with claim 1, the porous barrier comprising a central partition parallel to its plane and pierced with a plurality of lines of holes, and partitions serving as baffles whereby the cool perfused fluid is circulated in a hairpin loop along two successive paths which are parallel to the plane of the barrier.

9. A thermal shield in accordance with claim 1, the porous barrier comprising a plurality of successive partitions serving as baffles whereby the fluid is circulated along a path consisting of a plurality of successive hairpin loops.

10. A thermal shield in accordance with claim 7, the porous barrier comprising porous barrier compartments located in end-to-end relation in which the cool fluid is perfused in the direction of its plane, said compartments being defined by transverse sectional members and by said two plates pierced by holes forming respectively to the top and bottom portions of each compartment.

11. A thermal shield in accordance with claim 8, the porous barrier comprising a central partition heat-insulating liner of the same material as the remainder of the barrier and so arranged that the cool fluid is not perfused through said liner, openings for the passage of the cool fluid through said liner and protective eyelets around said openings for leak-tightness.

12. A thermal shield in accordance with claim 2, the headers for the supply of cool fluid being fixed on the internal wall of the enclosure and apertures in said headers opening into the cooling chamber for distributing the fluid over the porous barrier.

13. A thermal shield in accordance with claim 2, the headers for the supply of cool fluid being fixed directly on a rear plate supporting the porous barrier and the cooling chamber being filled with the same kind of fluid as the fluid circulated within the headers.

14. A thermal shield in accordance with claim 1, comprising serially-mounted headers supplying cool fluid to the cooling chamber and at least one pump for circulating said fluid, a heat exchanger for cooling the fluid which has picked up the heat from the cooling chamber prior to the return of said fluid to said chamber and a pipe for the return of the perfused fluid upstream of said heat exchanger.

References Cited

UNITED STATES PATENTS

| 2,215,532 | 9/1940 | Richardson | 165—135 X |
| 3,357,890 | 12/1967 | Friis et al. | 176—87 |
| 3,364,991 | 1/1968 | Wang | 165—135 |
| 3,395,075 | 7/1968 | Hench | 176—87 X |

ROBERT A. O'LEARY, Primary Examiner

A. W. DAVIS, Assistant Examiner

U.S. Cl. X.R.

165—107, 136; 176—87